(12) United States Patent
    Wu

(10) Patent No.:     US 12,609,597 B2

(45) Date of Patent:       Apr. 21, 2026

(54) MODULAR MAGNETIC-INDUCTION HORIZONTAL SWING MOTOR

(71) Applicant: NINGBO ICLIPPER ELECTRIC APPLIANCE CO., LTD, Ningbo (CN)

(72) Inventor: Haoze Wu, Ningbo (CN)

(73) Assignee: NINGBO ICLIPPER ELECTRIC APPLIANCE CO., LTD, Ningbo (CN)

( * ) Notice: Subject to any disclaimer, the term of this patent is extended or adjusted under 35 U.S.C. 154(b) by 208 days.

(21) Appl. No.: 18/537,556

(22) Filed: Dec. 12, 2023

(65) Prior Publication Data

US 2025/0141328 A1      May 1, 2025

(30) Foreign Application Priority Data

Oct. 27, 2023    (CN) .......................... 202322898522.5

(51) Int. Cl.
    *H02K 33/02*       (2006.01)
    *H02K 1/18*        (2006.01)

(52) U.S. Cl.
    CPC ............... *H02K 33/02* (2013.01); *H02K 1/18* (2013.01); *H02K 2213/12* (2013.01)

(58) Field of Classification Search
    CPC ........ H02K 33/02; H02K 33/16; H02K 35/02; H02K 1/18; H02K 2213/12
    USPC .......................................................... 310/15
    See application file for complete search history.

(56)                References Cited

U.S. PATENT DOCUMENTS

| | | | | |
|---|---|---|---|---|
| 2003/0094861 A1* | 5/2003 | Shimizu | ................. | H02K 33/10 |
| | | | | 310/36 |
| 2005/0134123 A1* | 6/2005 | Kobayashi | ............. | H02K 33/16 |
| | | | | 310/36 |
| 2018/0304482 A1* | 10/2018 | Murakami | ............... | H02K 7/04 |
| 2018/0319028 A1* | 11/2018 | Kraus | ...................... | B26B 19/28 |
| 2020/0358346 A1* | 11/2020 | Delaisse | ................ | H02K 35/02 |
| 2023/0198363 A1* | 6/2023 | Chi | ......................... | H02K 33/12 |
| | | | | 310/28 |

FOREIGN PATENT DOCUMENTS

CN           114123702 A      3/2022

* cited by examiner

*Primary Examiner* — Michael Andrews

(57)                ABSTRACT

A modular magnetic induction horizontal-swing motor includes an electromagnet module, including a base, a stator arranged on the base, and a stator coil fixedly arranged around the stator; and a horizontal swing module, including a support frame, a first horizontal swing seat, a second horizontal swing seat, a first mover and a second mover, wherein the support frame is fixedly connected to the base, the first horizontal swing seat and the second horizontal swing seat are arranged in the support frame and are able to swing horizontally, linking limit members are arranged on the first horizontal swing seat and the second horizontal swing seat, and elastic pieces are arranged on two sides of the support frame respectively and provide an elastic return force when the first horizontal swing seat and the second horizontal swing seat swing horizontally in a staggered manner.

10 Claims, 8 Drawing Sheets

MODULAR MAGNETIC-INDUCTION HORIZONTAL SWING MOTOR

BACKGROUND OF THE INVENTION

1. Technical Field

The invention relates to the technical field of motors, in particular to a modular magnetic-induction horizontal swing motor.

2. Description of Related Art

At present, a moving blade needs to reciprocate at a high frequency in use of a hair clipper, which is realized by means of a motor and a drive structure. A common drive structure for realizing such a process adopts a motor to drive an eccentric wheel connected to the end of a blade holder to rotate at a high speed so as to drive the blade to reciprocate at a high frequency. Such a drive structure has the following defects: 1, to realize the above drive process, the eccentric wheel and the blade holder have to be rotatably connected, which leads to friction between the eccentric wheel and the blade holder, and in a high-frequency application scenario, the abrasion of the joint of the eccentric wheel and the blade holder will be accelerated, resulting in frequent replacement of the eccentric wheel and the blade holder and increasing the cost: 2, the use of the drive structure based on the eccentric wheel requires a larger receiving cavity in the housing of the hair clipper, so the end, close to the head of the blade, of the hair clipper has to be designed to be thick, increasing the size of the hair clipper.

In view of this, a magnetic-induction horizontal swing motor is developed, which changes the arrangement of the rotor and the stator and directly drives two swing members to reciprocate in a staggered manner based on the magnetic induction principle, and when the two swing members reciprocate, corresponding elastic pieces and deflection limit members will swing synchronously to improve the stability in the staggered reciprocating process. For example, Chinese Patent (Publication No. CN 114123702A) discloses a brushless electromagnetic suspension vibration motor, which effectively solve the technical problems caused by the use of the eccentric wheel structure of the blade drive structure.

On one hand, the electromagnetic suspension vibration motor has a large number of parts, thus being difficult to assemble; on the other hand, the motor needs to be assembled from inside to outside, that is to say, when the motor is assembled, parts of the motor have to be assembled together one by one from inside to outside, which greatly compromises the assembly efficiency.

BRIEF SUMMARY OF THE INVENTION

The purpose of the invention is to provide a modular magnetic-induction horizontal swing motor, which is provided with an electromagnet module and a horizontal swing module that can be assembled separately and then assembled together, and can greatly improve the assembly efficiency by means of the modular structure.

The above technical purpose of the invention is fulfilled through the following technical solution: a modular magnetic-induction horizontal swing motor comprises:

an electromagnet module, comprising a base, a stator arranged on the base, and a stator coil fixedly arranged around the stator; and a horizontal swing module, comprising a support frame, a first horizontal swing seat, a second horizontal swing seat, a first mover and a second mover, wherein the support frame is fixedly connected to the base, the first horizontal swing seat and the second horizontal swing seat are arranged in the support frame and are able to swing horizontally, linking limit members are arranged on the first horizontal swing seat and the second horizontal swing seat, and elastic pieces are arranged on two sides of the support frame respectively and provide an elastic return force when the first horizontal swing seat and the second horizontal swing seat swing horizontally in a staggered manner; and the first mover is suspended in a first direction of the stator and fixed to the first horizontal swing seat, and the second mover is suspended in a second direction of the stator and fixed to the second horizontal swing seat.

Further, each of the linking limit members is provided with a central hole and limit grooves located on two sides of the central hole, fixing rods matched with the central holes are arranged on the support frame, a limit shaft is arranged on the first horizontal swing seat, the limit shaft stretches into the limit grooves on the side adjacent to the limit shaft and is able to slide in the limit grooves, an output shaft is arranged on the second horizontal swing seat, and the output shaft penetrates through the limit grooves on the side adjacent to the output shaft and is able to slide in the limit grooves.

Further, upper ends of the elastic pieces are fixedly connected to the support frame, lower ends of the elastic pieces are connected to the first horizontal swing seat and the second horizontal swing seat, and lower portions of the elastic pieces are separated by a connecting groove, such that the lower portion of the elastic piece connected to the first horizontal swing seat and the lower portion of the elastic piece connected to the second horizontal swing seat are able to deform separately.

Further, two sets of elastic pieces are arranged on two sides of the support frame respectively, the elastic piece located on the side corresponding to the first horizontal swing seat has an end connected to the first horizontal swing seat and an end connected to the support frame, and the elastic piece located on the side corresponding to the second horizontal swing seat has an end connected to the second horizontal swing seat and an end connected to the support frame.

Further, the elastic pieces are configured as sheet structures, and multiple elastic pieces are stacked to form an elastic piece set for providing an elastic return force for the first horizontal swing seat and the second horizontal swing seat.

Further, lugs extending towards the second horizontal swing seat are symmetrically arranged on two sides of the first horizontal swing seat, and elastic members are arranged between the lugs and the second horizontal swing seat in an abutting manner.

Further, the first horizontal swing seat comprises a first mounting block and a first horizontal swing block fixedly connected to the first mounting block, the first mover is mounted on a lower portion of the first mounting block, the second horizontal swing seat comprises a second mounting block and a second horizontal swing block fixedly connected to the second mounting block, and the second mover is mounted on a lower portion of the second mounting block.

Further, lower protrusions are arranged at a bottom of the base, and mounting holes are formed in the lower protrusions.

Further, connecting pillars located on two sides of the stator are convexly arranged on the base, and the support frame is mounted on the two connecting pillars through fasteners.

Further, the stator, the base and the connecting pillars on the two sides of the stator are integrated members, and each of the integrated members is formed by a plurality of unit pieces.

Further, two stators are arranged on the base in a spaced manner, and stator coils are wound around the stators, a connecting pillar is arranged on the base, and the support frame is mounted on the connecting pillar through a fastener.

To sum up, the invention has the following beneficial effects:

On one hand, the magnetic-induction horizontal swing motor has a smaller number of parts as compared with the prior art, thus greatly reducing the number of parts to be assembled and improving the assembly efficiency: on the other hand, the electromagnet module and the horizontal swing module can be assembled separately and then assembled together, so the assembly efficiency is greatly improved by means of the modular structure.

In the FIGS.: 10, electromagnet module; 20, base; 21, lower protrusion; 22, mounting hole; 23, connecting pillar; 30, stator; 40, stator coil; 41, coil former; 50, horizontal swing module; 60, support frame; 61, fixing rod; 62, U-shaped portion; 63, middle connecting portion; 64, mounting cylinder; 70, first horizontal swing seat; 71, limit shaft; 72, lug; 73, first mounting block; 74, first horizontal swing block; 80, second horizontal swing seat; 81, output shaft; 82, second mounting block; 83, second horizontal swing block; 90, first mover; 100, second mover; 110, linking limit member; 1111, central hole; 1112, limit groove; 120, elastic piece; 130, elastic member.

DETAILED DESCRIPTION OF THE INVENTION

The invention will be further described below in conjunction with accompanying drawings.

Figure 1:
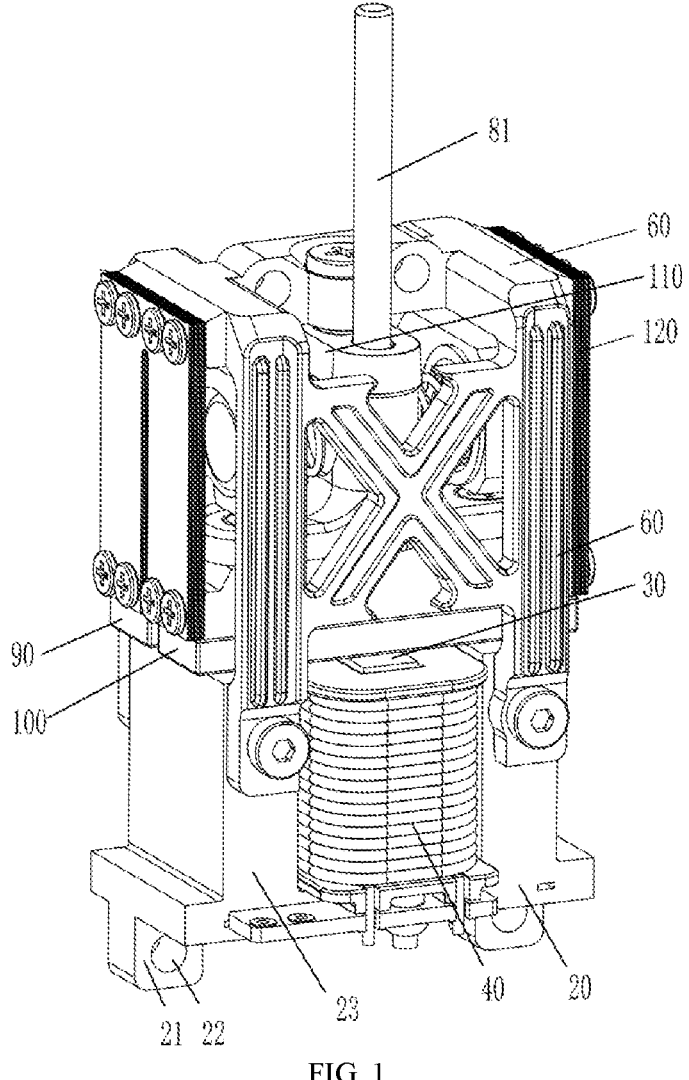
FIG. 1 is an overall structural view of the invention.
Figure 2:
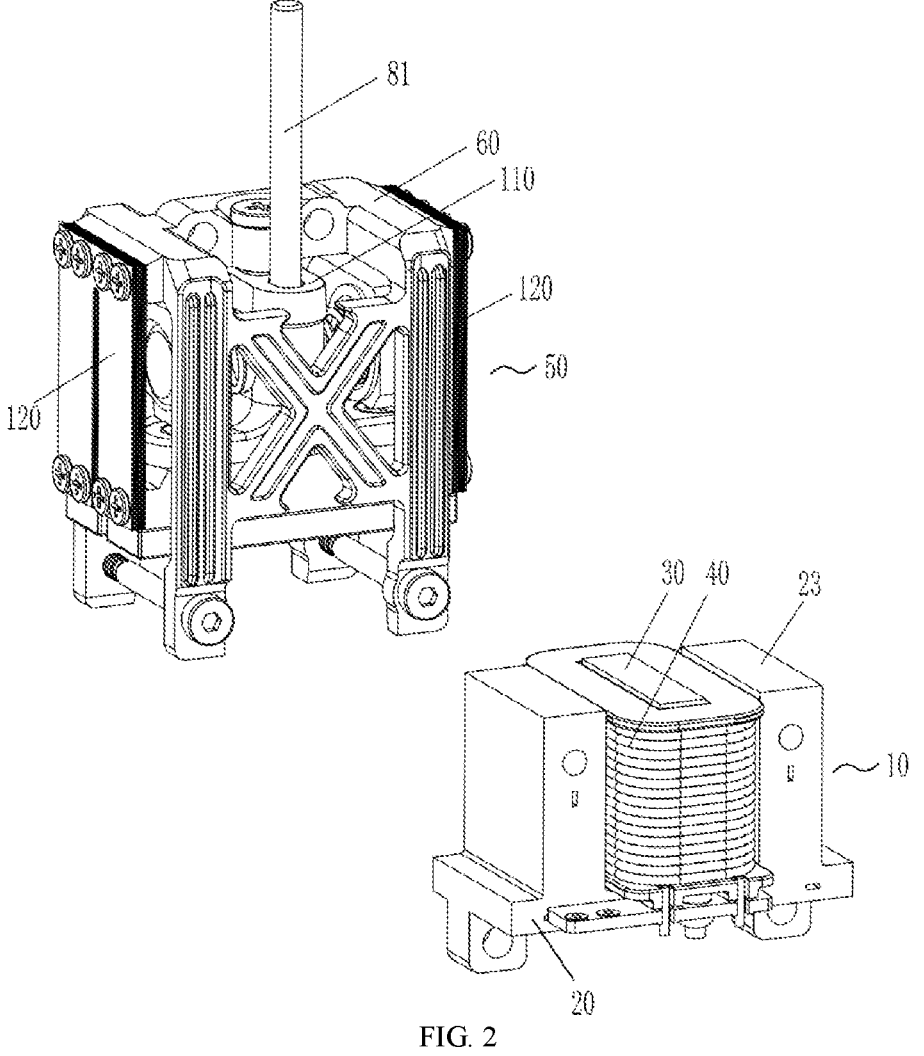
FIG. 2 is a structural view of an electromagnet module and a horizontal swing module according to the invention.
Figure 3:
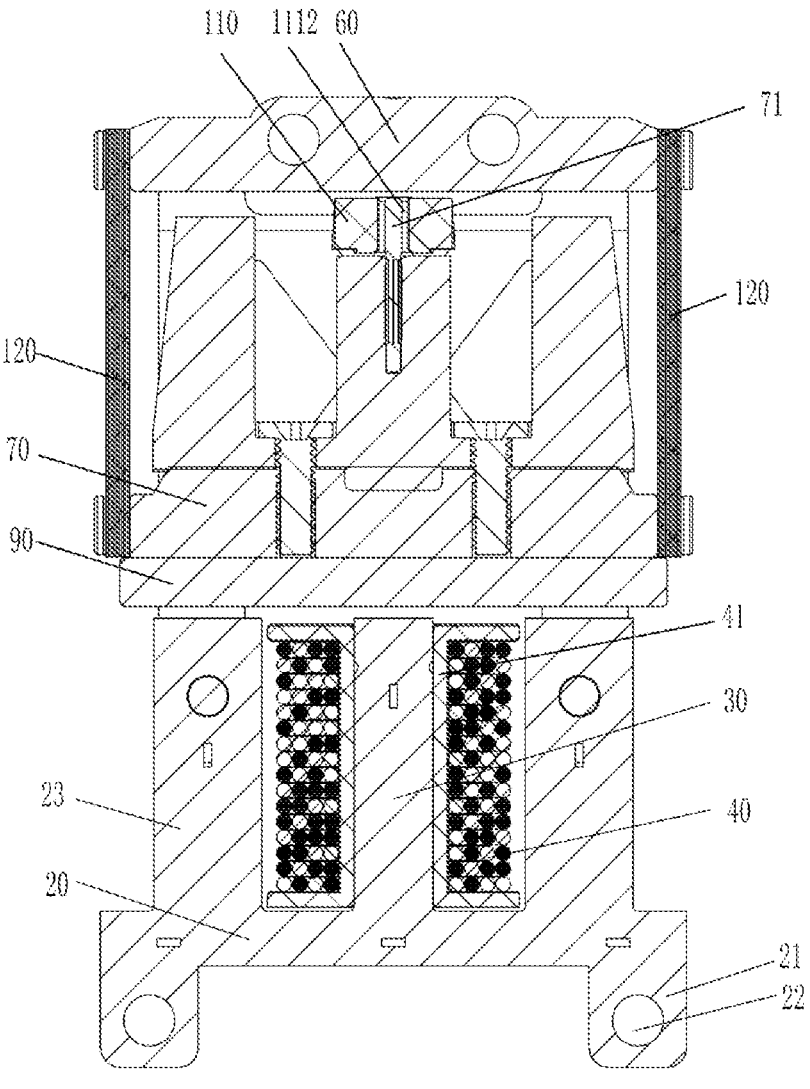
FIG. 3 is a sectional view of the invention.
Figure 4:
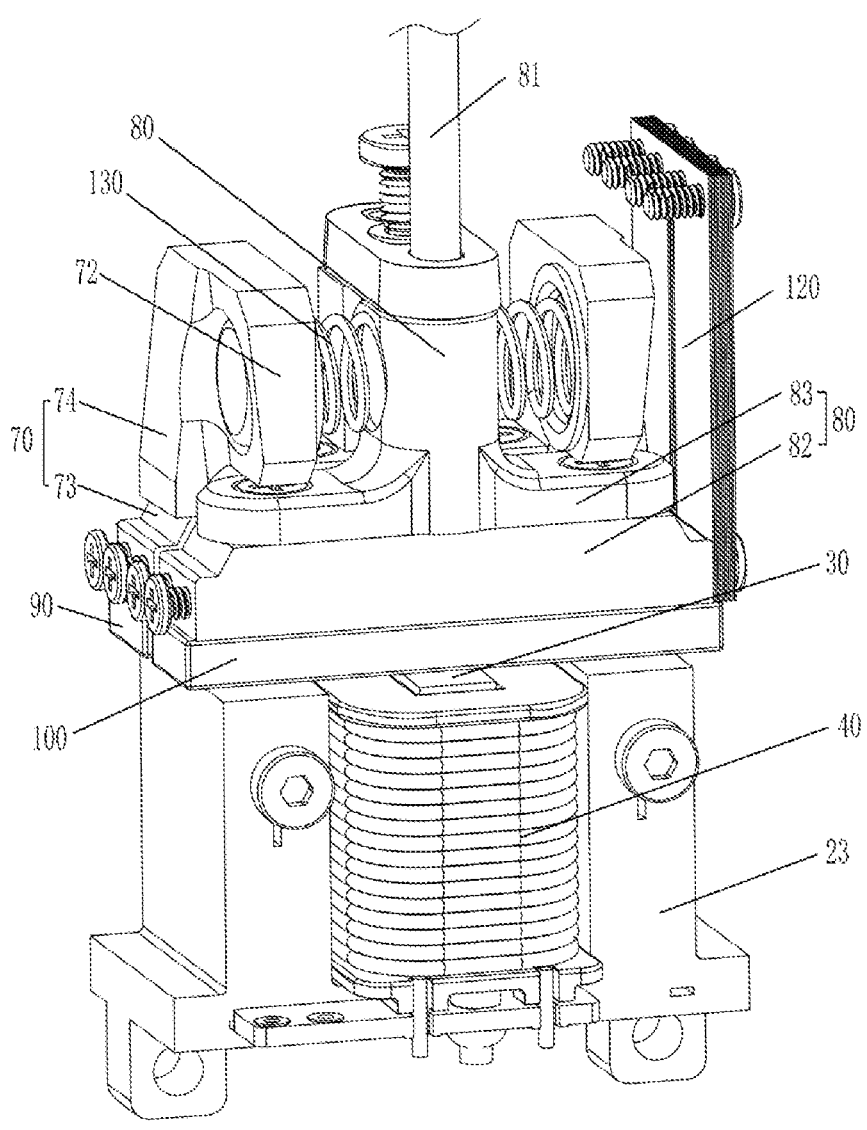
FIG. 4 is an installation structural view of elastic members according to the invention.
Figure 5:
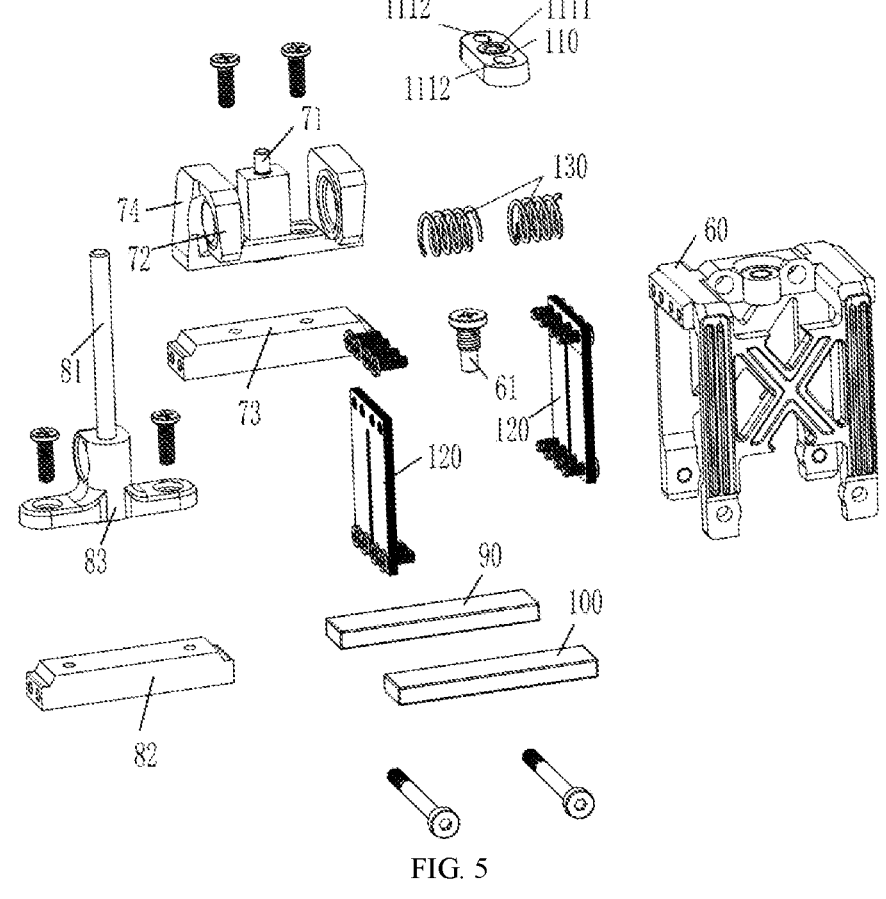
FIG. 5 is an exploded view of the invention.
Figure 6:
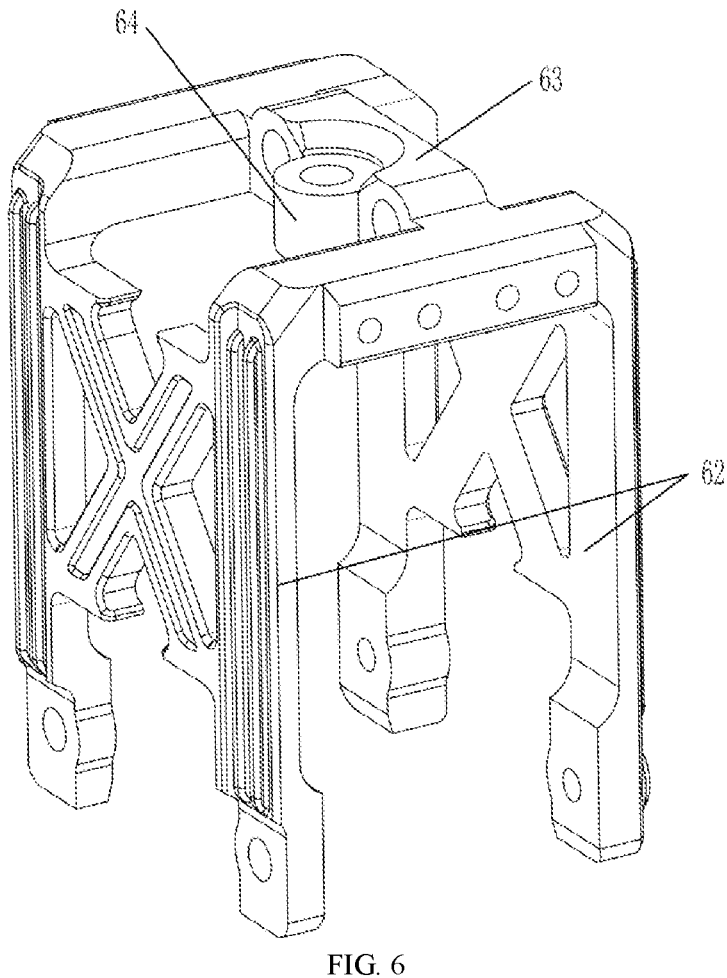
FIG. 6 is a structural view of a support frame according to the invention.
Figure 7:
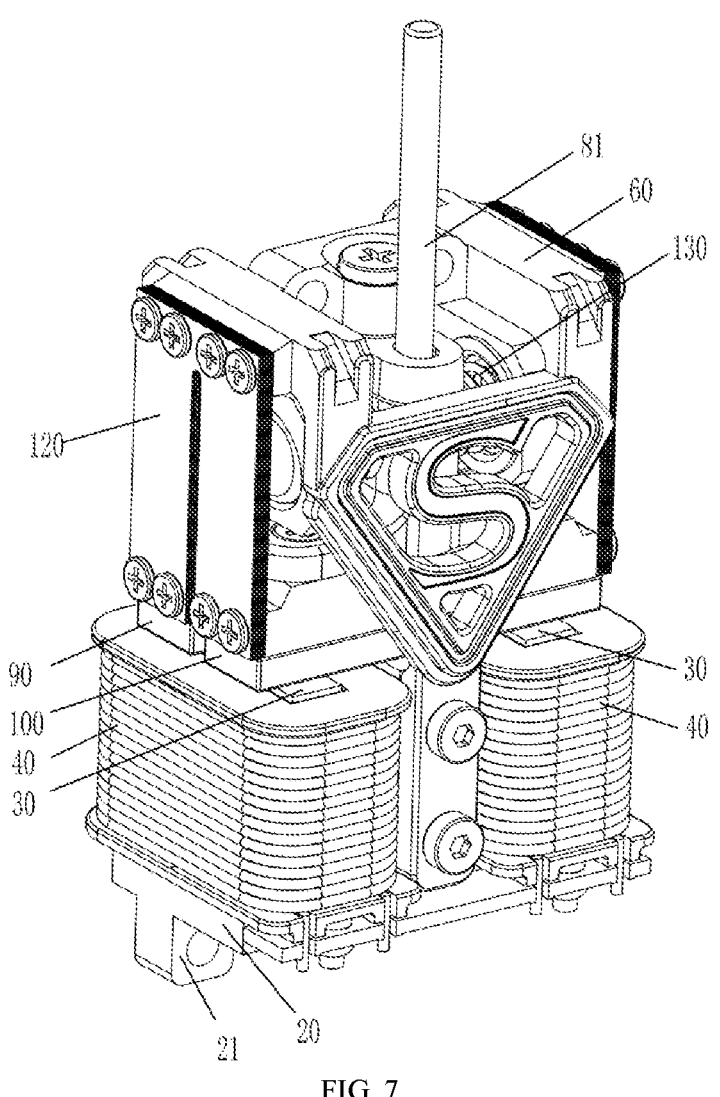
FIG. 7 is a structural view of the invention in presence of two stator coils.
Figure 8:
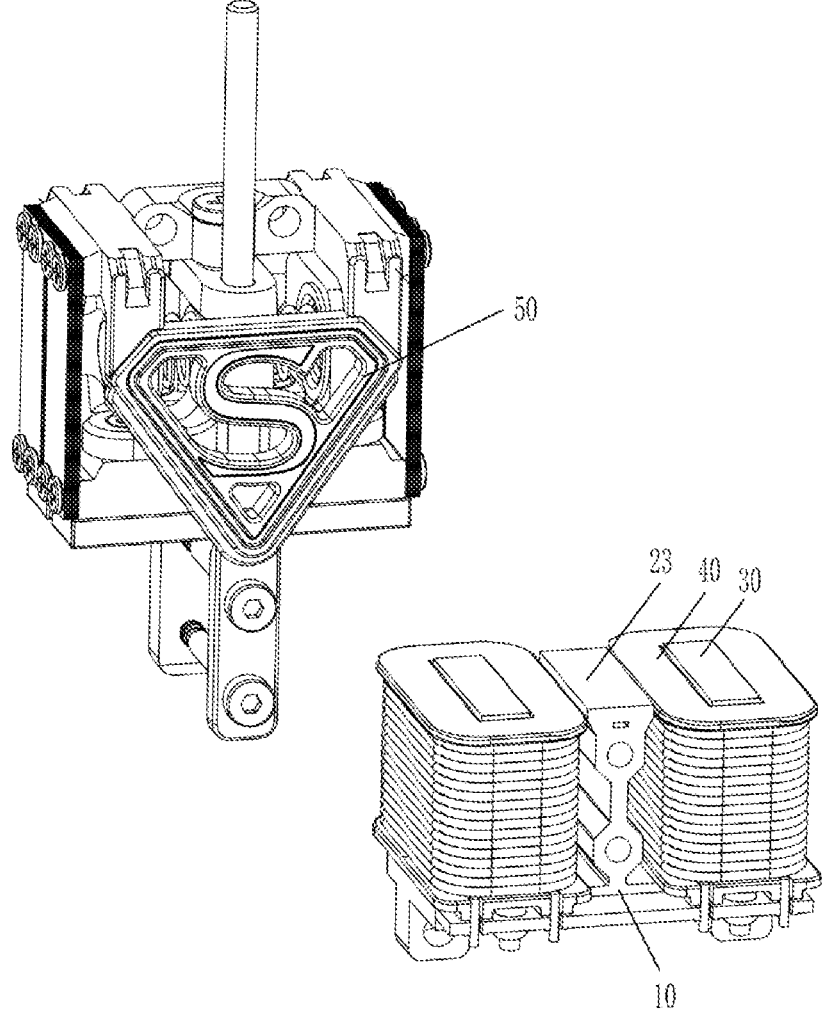
FIG. 8 is a disassembled view of the invention in presence of two stator coils.

As shown in FIGS. 1-8, a modular magnetic-induction horizontal swing motor comprises an electromagnet module 10 and a horizontal swing module 50. When the modular magnetic-induction horizontal swing motor is assembled, the electromagnet module 10 and the horizontal swing module 50 are assembled separately and then assembled together, and the assembly efficiency is greatly improved by means of the modular structure.

The electromagnet module 10 comprises a base 20, a stator 30 arranged on the base 20, and a stator coil 40 fixedly arranged around the stator 30. In the invention, the stator 30 is formed on the base 20 and is a component that can lead a magnetic field generated in the stator coil 40 to a preset position, and the stator coil 40 is wound on a coil former 41. In this embodiment, the coil former 41 is shaped like a rectangular tube formed by an insulator, a central groove penetrating through the coil former 41 is formed in the center of the coil former 41, and the stator 30 is matched with the central groove. Specifically, the stator 30 is shaped like a rectangular column, and the central groove is a rectangular groove. In this way, the coil former 41 can be stably maintained outside the stator 30. To improve the magnetic field effect of the stator 30 on movers, an upper portion of the stator 30 stretches out of the central groove and is higher than the stator coil 40 and the coil former 41.

The horizontal swing module 50 comprises a support frame 60, a first horizontal swing seat 70, a second horizontal swing seat 80, a first mover 90 and a second mover 100, wherein the support frame 60 is fixedly connected to the base 20, the first horizontal swing seat 70 and the second horizontal seat 80 are arranged in the support frame 60 and are able to swing horizontally, linking limit members 110 are arranged on the first horizontal swing seat 70 and the second horizontal swing seat 80, elastic pieces 120 are arranged on two sides of the support frame 60 respectively, and when the first horizontal swing seat 70 and the second horizontal swing seat 80 swing horizontally in a staggered manner, the elastic pieces 120 provides an elastic return force. The first mover 90 is suspended in a first direction of the stator 30 and fixed to the first horizontal swing seat 70, and the second mover 100 is suspended in a second direction of the stator 30 and fixed to the second horizontal swing seat 80. With FIG. 1 as a reference, the first direction is the back direction, and the second direction is the front direction. In the invention, the first mover 90 is suspended, which means that a gap exists between the first mover 90 and the stator 30, and the second mover 100 is suspended, which means that a gap exists between the second mover 100 and the stator 30.

In this embodiment, connecting pillars 23 located on two sides of the stator 30 are convexly arranged on the base 20, and the support frame 60 is mounted on the two connecting pillars 23 through fasteners. Specifically, the support frame 60 comprises two U-shaped portions 62 spaced apart from each other and a middle connecting portion 63 for connecting the two U-shaped portions 62, and the U-shaped portions 62 are in one-to-one correspondence with the connecting pillars 23. The horizontal swing module 50 can be assembled on the electromagnet module 10 merely by fixedly connecting the U-shaped portions 62 with the corresponding connecting pillars 23.

In another embodiment, two stators 30 are arranged on the base 20 in a spaced manner, and stator coils 40 are wound around the stators 30 respectively. By increasing the number of the stators 30 and the number of the stator coils 40, the interactive force applied to the movers can be improved, thus increasing the horizontal swing speed of the horizontal swing module 50. A connecting pillar 23 located between the two stators 30 is arranged on the base 20, a connecting arm corresponding to the connecting pillar 23 is arranged on the support frame 60, and the connecting arm is connected with the connecting pillar 23 through a fastener to mount the support frame 60 on the connecting pillar 23.

Each of the linking limit members 110 is provided with a central hole 1111 and limit grooves 1112 located on two sides of the central hole 1111. Fixing rods 61 matched with the central holes 1111 are arranged on the support frame 60. A limit shaft 71 is arranged on the first horizontal swing seat 70, and the limit shaft 71 stretches into the limit grooves 1112 on the side adjacent to the limit shaft 71 and is able to slide in the limit grooves 1112. An output shaft 81 is arranged on the second horizontal swing seat 80, and the output shaft 81 penetrates through the limit grooves 1111 on the side adjacent to the output shaft 81 and is able to slide in the limit grooves 1112. In this embodiment, the limit grooves 1112 are kidney-shaped holes, and when the first horizontal swing seat 70 and the second horizontal swing seat 80 swing horizontally in a staggered manner, the limit shaft 71 and the output shaft 81 slide along the corresponding limit grooves 1112 and drive the linking limit members 1110 to rotate with the fixing rods 61 as rotation axes. The linking limit members 110 can greatly improve the stability when the first horizontal swing seat 70 and the second horizontal swing seat 80 swing horizontally in a staggered manner. In the invention, a mounting cylinder 64 is arranged on the middle connecting portion 63, each of the fixing rods 61 is provided with an upper threaded portion and a lower unthreaded portion, the fixing rods 61 are threadedly connected to the mounting cylinder 64 through the upper threaded portions, and the lower unthreaded portions stretch out of the mounting cylinder 64 to be used as the rotation axes of the linking limit members 110.

In this embodiment, upper ends of the elastic pieces 120 are fixedly connected to the support frame 60, lower ends of the elastic pieces 120 are connected to the first horizontal swing seat 70 and the second horizontal swing seat 80, and lower portions of the elastic pieces 120 are separated by a connecting groove, such that the lower portion of the elastic piece 120 connected to the first horizontal swing seat 70 and the lower portion of the elastic piece 120 connected to the second horizontal swing seat 80 are able to deform separately. The elastic pieces 120 are configured as inverted U-structures, closed ends of the U-structures are connected to the support frame 60, and two legs of an open end of each of the U-structures are correspondingly connected to the first horizontal swing seat 70 and the second horizontal swing seat 80.

In this embodiment, two sets of elastic pieces 120 are arranged on two sides of the support frame 60 respectively, the elastic piece 120 located on the side corresponding to the first horizontal swing seat 70 has an end connected to the first horizontal swing seat 70 and an end connected to the support frame 60, and the elastic piece 120 located on the side corresponding to the second horizontal swing seat 80 has an end connected to the second horizontal swing seat 80 and an end connected to the support frame 60.

In this embodiment, the elastic pieces 120 are configured as sheet structures, and multiple elastic pieces 120 are stacked to form an elastic piece set for providing an elastic return force for the first horizontal swing seat 70 and the second horizontal swing seat 80. That is to say, a single electric piece 120 may be used for providing an elastic return force, or an elastic piece set formed by multiple elastic pieces 120 may be used for providing an elastic return force. By adopting the elastic piece set, the service life of the elastic pieces 120 can be effectively prolonged, and the elastic return force can be increased effectively.

In this embodiment, lugs 72 extending towards the second horizontal swing seat 80 are symmetrically arranged on two sides of the first horizontal swing seat 70, and elastic members 130 are arranged between the lugs 72 and the second horizontal swing seat 80 in an abutting manner. In this way, the first horizontal swing seat 70 and the second horizontal swing seat 80 can swing horizontally in a staggered manner more closely and smoothly under the action of the elastic force of the elastic members 130.

The first horizontal swing seat 70 comprises a first mounting block 73 and a first horizontal swing block 74 fixedly connected to the first mounting block 73, the first mover 90 is mounted on a lower portion of the first mounting block 73, the second horizontal swing seat 80 comprises a second mounting block 82 and a second horizontal swing block 83 fixedly connected to the second mounting block 82, and the second mover 100 is mounted on a lower portion of the second mounting block 82. As an equivalent substation, the first mounting block 73 and the first horizontal swing block 74 are formed integrally, and the second mounting block 82 and the second horizontal swing block 83 are formed integrally.

Lower protrusions 21 are arranged at the bottom of the base 20, mounting holes 22 are formed in the lower protrusions 21, and the base 20 is fixedly mounted at a desired position through the mounting holes 22.

The stator 30, the base 20 and the connecting pillars 23 on the two sides of the stator 30 are integrated members, each of the integrated members is formed by a plurality of unit pieces, and the unit pieces are silicon steel sheets. The integrated member is formed by pressing multiple silicon steel sheets, such that the magnetic conduction effect is good, and the magnetic field effect can be effectively improved.

When the modular magnetic-induction horizontal swing motor is used, first, a forward current is applied to the stator coil 40 to drive the stator coil 40 and the stator 30 to form an induced magnetic field jointly under the magnetic effect of the current, and the movers will cut the induced magnetic field, such that one of the two movers is driven to move forwards and the other mover is drive to move in an opposite direction to realize staggered opposite reciprocation. During opposite reciprocation of the two movers, on one hand, the movers will drive the corresponding horizontal swing seats to move to drive the elastic pieces 120 to deform; on the other hand, the corresponding elastic pieces 120 will apply an elastic return force to the first horizontal swing seat 70 and the second horizontal swing seat 80, the first horizontal swing seat 70 and the second horizontal swing seat 80 will squeeze the elastic piece 130 on one side and pull the elastic piece 130 on the other side, such that the elastic piece 130 on one side is compressed, and the elastic piece 130 on the other side is stretched. When stopping moving, the movers will return by means of the elastic return force of the elastic pieces 120 and the elastic member 130. When the direction of the current in the stator coil 40 is changed, the first mover 90 and the second mover 100 will move reversely, such that staggered reciprocation of the first horizontal swing seat 70 and the second horizontal swing seat 80 is realized. In this way, the motor can drive a blade holder and a blade of a hair clipper to reciprocate at a high frequency, and as compared with the existing structure using a motor to drive an eccentric wheel, the driving structure of the motor will be less abraded.

To sum up, the invention has the following beneficial effects:

On one hand, the magnetic-induction horizontal swing motor has a smaller number of parts as compared with the prior art, thus greatly reducing the number of parts to be assembled and improving the assembly efficiency: on the other hand, the electromagnet module and the horizontal swing module can be assembled separately and then assembled together, so the assembly efficiency is greatly improved by means of the modular structure.

The above embodiments are merely preferred ones of the invention. All equivalent transformations or modifications made according to the structures, features and principles within the scope of the invention patent application should fall within the scope of the invention patent application.

The invention claimed is:

1. A modular magnetic-induction horizontal swing motor, comprising:

an electromagnet module (10), comprising a base (20), a stator (30) arranged on the base (20), and a stator coil (40) fixedly arranged around the stator (30); and a horizontal swing module (50), comprising a support frame (60), a first horizontal swing seat (70), a second horizontal swing seat (80), a first mover (90) and a second mover (100), wherein the support frame (60) is fixedly connected to the base (20), the first horizontal swing seat (70) and the second horizontal swing seat (80) are arranged in the support frame (60) and are able to swing horizontally, linking limit members (110) are arranged on the first horizontal swing seat (70) and the second horizontal swing seat (80), and elastic pieces (120) are arranged on two sides of the support frame (60) respectively and provide an elastic return force when the first horizontal swing seat (70) and the second horizontal swing seat (80) swing horizontally in a staggered manner; and the first mover (90) is suspended in a first direction of the stator (30) and fixed to the first horizontal swing seat (70), and the second mover (100) is suspended in a second direction of the stator (30) and fixed to the second horizontal swing seat (80);

wherein each of the linking limit members (110) is provided with a central hole (1111) and limit grooves (1112) located on two sides of the central hole (1111), fixing rods (61) matched with the central holes (1111) are arranged on the support frame (60), a limit shaft (71) is arranged on the first horizontal swing seat (70), the limit shaft (71) stretches into the limit grooves (1112) on the side adjacent to the limit shaft (71) and is able to slide in the limit grooves (1112), an output shaft (81) is arranged on the second horizontal swing seat (80), and the output shaft (81) penetrates through the limit grooves (1112) on the side adjacent to the output shaft (81) and is able to slide in the limit grooves (1112).

2. The modular magnetic-induction horizontal swing motor according to claim 1, wherein upper ends of the elastic pieces (120) are fixedly connected to the support frame (60), lower ends of the elastic pieces (120) are connected to the first horizontal swing seat (70) and the second horizontal swing seat (80), and lower portions of the elastic pieces (120) are separated by a connecting groove, such that the lower portion of the elastic piece (120) connected to the first horizontal swing seat (70) and the lower portion of the elastic piece (120) connected to the second horizontal swing seat (80) are able to deform separately.

3. The modular magnetic-induction horizontal swing motor according to claim 1, wherein two sets of elastic pieces (120) are arranged on two sides of the support frame (60) respectively, the elastic piece (120) located on the side corresponding to the first horizontal swing seat (70) has an end connected to the first horizontal swing seat (70) and an end connected to the support frame (60), and the elastic piece (120) located on the side corresponding to the second horizontal swing seat (80) has an end connected to the second horizontal swing seat (80) and an end connected to the support frame (60).

4. The modular magnetic-induction horizontal swing motor according to claim 1, wherein the elastic pieces (120) are configured as sheet structures, and multiple said elastic pieces (120) are stacked to form an elastic piece set for providing an elastic return force for the first horizontal swing seat (70) and the second horizontal swing seat (80).

5. The modular magnetic-induction horizontal swing motor according to claim 1, wherein lugs (72) extending towards the second horizontal swing seat (80) are symmetrically arranged on two sides of the first horizontal swing seat (70), and elastic members (130) are arranged between the lugs (72) and the second horizontal swing seat (80) in an abutting manner.

6. The modular magnetic-induction horizontal swing motor according to claim 1, wherein the first horizontal swing seat (70) comprises a first mounting block (73) and a first horizontal swing block (74) fixedly connected to the first mounting block (73), the first mover (90) is mounted on a lower portion of the first mounting block (73), the second horizontal swing seat (80) comprises a second mounting block (82) and a second horizontal swing block (83) fixedly connected to the second mounting block (82), and the second mover (100) is mounted on a lower portion of the second mounting block (82).

7. The modular magnetic-induction horizontal swing motor according to claim 1, wherein lower protrusions (21) are arranged at a bottom of the base (20), and mounting holes (22) are formed in the lower protrusions (21).

8. The modular magnetic-induction horizontal swing motor according to claim 1, wherein connecting pillars (23) located on two sides of the stator (30) are convexly arranged on the base (20), and the support frame (60) is mounted on the two connecting pillars (23) through fasteners.

9. The modular magnetic-induction horizontal swing motor according to claim 8, wherein the stator (30), the base (20) and the connecting pillars (23) on the two sides of the stator (30) are integrated members, and each of the integrated members is formed by a plurality of unit pieces.

10. The modular magnetic-induction horizontal swing motor according to claim 1, wherein two said stators (30) are arranged on the base (20) in a spaced manner, and stator coils (40) are wound around the stators (30), a connecting pillar (23) is arranged on the base (20), and the support frame (60) is mounted on the connecting pillar (23) through a fastener.

* * * * *